UNITED STATES PATENT OFFICE.

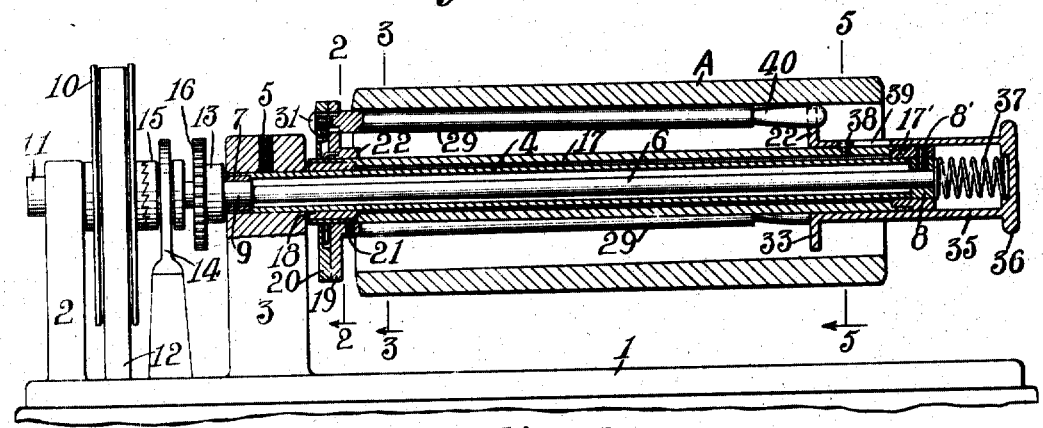
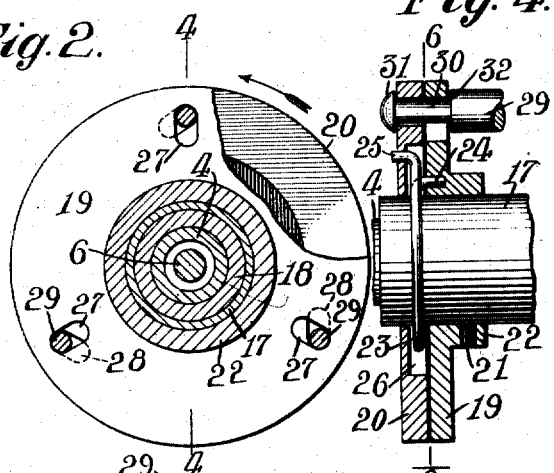
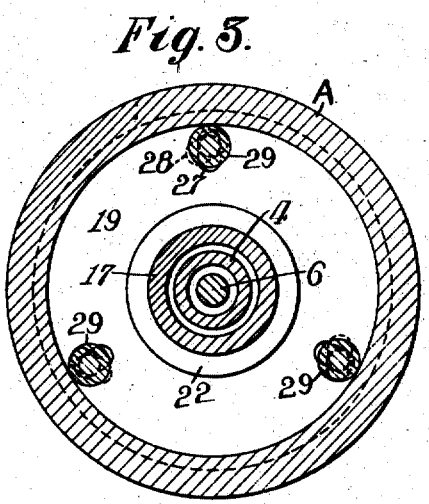
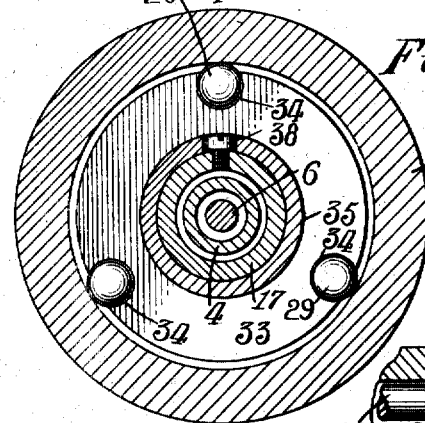
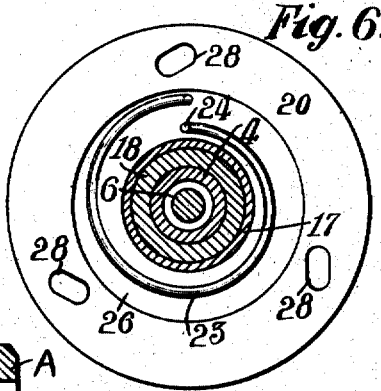
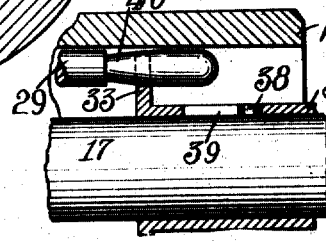

NEWMAN H. HOLLAND, OF WEST ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH.

1,213,197.   Specification of Letters Patent.   Patented Jan. 23, 1917.

Application filed September 29, 1913.   Serial No. 792,253.

*To all whom it may concern:*

Be it known that I, NEWMAN H. HOLLAND, a subject of the King of Great Britain, and a resident of West Orange, in the county of Essex and State of New Jersey, have invented a new and useful Improvement in Phonographs, of which the following is a description.

My invention relates to phonographs and more particularly to an improved sound record support therefor, and is an improvement on the invention disclosed in my copending application, Serial No. 653,155 filed October 6, 1911, and entitled phonographs and on which Patent No. 1,167,500 was granted on January 11, 1916.

Ordinary cylindrical phonograph records are provided with tapered bores but the diameters of these bores vary somewhat and also change to a considerable extent under different temperature conditions, whereas the supports upon which the records are usually mounted vary and change but little in diameter.

In using phonographs of the commercial type, it is very important, in transcribing, that the record should occupy the same relative longitudinal position with respect to its support, and the scale usually associated therewith, as it did when dictated, in order that the transcriber may quickly and correctly associate the instructions, which the dictator usually indicates on a memorandum sheet having a scale corresponding to the scale on the phonograph, with the proper parts of the dictated record and thereby experience no difficulty in carrying out such instructions in making a transcription of such record. However, owing to the variance and changing of the diameters of the records as described above, it frequently happens that the attempt to push these records to a predetermined position, on the supports therefor commonly employed, results in breaking the same.

The principal object of my invention is to provide an improved support for sound records which, while adapted to firmly hold the records, will permit the same to be always pushed thereon to a predetermined relative longitudinal position without breaking. In conformity with this object, I preferably provide a support in which the record engaging means is movable toward and away from the axis of the support, and in which means is provided tending to yieldingly maintain the said engaging means in the outermost position relative to the axis of the support, but which will permit inward movement thereof to allow the record, after the same has been pushed thereon to such an extent as to tightly engage said engaging means, to be pushed still farther onto the support.

A further object of my invention is to provide, in a support having the above characteristics, a construction whereby the support may be readily manipulated to permit a record to be readily removed therefrom without danger of damaging or breaking such record.

Other objects and features of my invention will appear more fully in the following description and appended claims.

For a clearer understanding of my invention, attention is hereby directed to the drawing accompanying and forming a part of the specification and in which—

Figure 1 is a front elevation partly in section of a phonograph embodying my invention; Fig. 2 is an enlarged sectional view on line 2—2 of Fig. 1, with a portion in back of the section plane broken away; Fig. 3 is an enlarged sectional view of the support on line 3—3 of Fig. 1, showing the relative positions of its parts when a record has been pushed thereon to a position beyond that shown in Fig. 1; Fig. 4 is a section on line 4—4 of Fig. 2, with parts shown in elevation; Fig. 5 is an enlarged sectional view, partly in elevation, on line 5—5 of Fig. 1; Fig. 6 is a sectional view on line 6—6 of Fig. 4, parts being omitted; and Fig. 7 is an enlarged fragmentary view of the support, as shown in Fig. 1, with the parts thereof in position to permit a record to be readily removed.

In all the views, corresponding parts are designated by the same reference characters.

The phonograph to which my invention is shown applied in Fig. 1, is of well known construction and comprises a bed plate 1 provided with standards 2 and 3. Supported at one end in the standard 3 is a stationary tube or sleeve 4 secured rigidly in position by a set screw or equivalent means 5. The driving shaft 6 for the phonograph is mounted to extend through the tube 4, the left hand end of the said shaft being provided with an enlargement 9 which is rotatable within a bearing 7 in the corresponding end of the tube or sleeve 4.

Reference character 16 represents a gear, the hub 13 of which is suitably secured to the enlarged portion 9 of the shaft 6, and from this gear, by connections (not shown), the feed screw of the phonograph is driven in the usual manner. A collar or plug 8, suitably secured, as by a set screw 8' to the right hand end of the shaft 6, as shown in Fig. 1, engages the corresponding end of the tube 4 and coöperates with the hub 13 of gear 16, engaging the end of the bearing 7, to prevent the shaft 6 from shifting longitudinally with reference to the tube 4. Power is transmitted to the driving shaft of the phonograph by means of a belt 12 encircling the pulley 10 rotatable on the shaft 11, which latter is suitably secured in the standard 2 as by a set screw or equivalent means (not shown). Any suitable means (not shown) is employed to prevent movement of the pulley 10 axially of the shaft 11. The shaft 11 is axially in line with the shaft 6, and the pulley 10 thereon is adapted to be connected to shaft 6 by a clutch 15, which is slidable back and forth upon the enlarged portion 9 of the driving shaft 6. The movement of clutch 15 along the enlarged portion 9 of shaft 6 is controlled in the usual manner by means comprising a bell crank lever 14 loosely engaging the clutch.

My improved record support comprises a tubular shaft 17 secured at its opposite ends, as by friction, to bearings 17' and 18 whereby it is rotatably mounted upon the tube 4, bearing 17' being suitably secured, as by means of set screw 8', to the collar 8 so that the shaft 17 will rotate with the shaft 6.

Reference characters 19 and 20 represent a pair of adjacent flanges or disks mounted on the shaft 17 adjacent the inner or left hand end thereof, the disk 20 being loose on the shaft 17, and the disk 19 being secured thereto as by a set screw 21 passing through the collar 22, preferably formed integrally with disk 19. The disks 19 and 20 are preferably of the same diameter and are resiliently connected, preferably by means of a spiral spring 23 having bent ends 24 and 25 respectively engaging in recesses provided therefor in the respective flanges or disks 19 and 20. That face of disk 20 adjacent disk 19 is preferably provided with a depression or circular recess 26 within which the spring 23 is located, whereby the disks may be maintained in close proximity to each other, as shown in Fig. 4. The disk 19 is provided with a number of similar and equally spaced slots 27 and the disk 20 with a corresponding number of slots 28 of the same size as slots 27 and respectively coöperating therewith in a manner about to be set forth. The outer walls of all the slots 27 and 28 are located at the same distance from the axis of shaft 6, the slots 27 being arranged radially of the axis of the support, while the slots 28 in disk 20 are preferably arranged at acute and equal angles to the slots 27, as clearly shown in Fig. 2.

Reference character 29 represents rods or members extending longitudinally of the shaft 17 and which are adapted to engage the bore of a cylindrical phonograph record A. Rods 29 are preferably cylindrical in form and correspond in number to the number of slots 27 or 28, the inner end of each of these rods being formed with a slightly reduced cylindrical portion 30 seated in a pair of coöperating slots 27 and 28 of disks 19 and 20. The reduced portions 30 are slightly less in diameter than the width of slots 27 and 28, whereby they may readily move therein during the manipulation of the support. Into the inner end of each rod 29 is threaded a screw 31, the head of which coöperates with the shoulder 32, formed on the rod 29 by the reduced portion 30, to maintain disk 20 closely adjacent disk 19 and at the same time to prevent substantial longitudinal movement of the rod 29 with respect to shaft 17. The reduced portions 30 of rods 29 are preferably slightly greater in length than the combined thickness of disks 19 and 20 so as to permit movement of the outer ends of the rods toward and away from the axis of shaft 6 about the inner ends thereof. Spring 23 is so arranged that, whenever the reduced end portions 30 of rods 29 are seated in the coöperating pairs of slots 27 and 28, it will be under tension and constantly tend to turn or rotate disk 20 on shaft 17 and with respect to disk 19 in the direction of the arrow in Fig. 2, and thus, by the co-action of the walls of the respective pairs of relatively angularly disposed slots 27 and 28 with such reduced portions 30, to maintain the inner ends of rods 29 in outermost position in engagement with the outer walls of the slots 27 and 28, as shown in Fig. 2. The portion of disk 19 between its outer circumference and a circle tangent to the outer walls of slots 27, about the axis of shaft 6 as a center, is substantially greater in width than the shoulders 22 of rods 29 and serves as an abutment against which the inner end of each record A should be pushed when applied to the support. Another flange or disk 33 is slidably mounted on the shaft 17 adjacent the outer end thereof and is provided with similar and equally spaced openings 34 arranged at equal distances from the axis of shaft 6 and corresponding in number to the slots 27 or 28. The inner walls of openings 34 are located slightly nearer to the axis of shaft 6 than those of slots 27. The outer ends of rods 29 each fits loosely in one of the openings 34 in the disk or flange 33. As clearly shown in Fig. 5, the openings 34 extend through slightly more than a semicircle so that the rods 29 are retained against disengagement laterally from the flange or disk 33 and at the same time extend slightly beyond the flange or disk so as to be adapted to engage the bore of the sound record. The openings 34 are slightly larger in diameter than the rods 29 so as to permit easy movement of the latter therein during the manipulation of the device. By reason of the location of the openings 34 nearer the axis of the support than the slots 27, the support formed by the rods 29 has a slight taper toward the outer end thereof. The flange or disk 33 is provided with a cup shaped portion or member 35 slidably mounted on the shaft 17, this cup shaped member being preferably provided with a head 36 to facilitate the operation thereof. A coiled spring 37, or other suitable resilient member, is located between the end of the bore of the cup shaped member 35 and the collar 8 and serves to hold the flange or disk 33 in its outer position, and thereby to retain the members 29 in firm engagement with the bore of the record A, as shown in Fig. 1. A screw 38, or other suitable guide, is secured to the shaft 17 and its head coöperates with a longitudinal slot 39 in the cup-shaped member 35 to hold the disk or flange 33 with its openings 34 in axial alinement with the slots 27 in the disk or flange 19. This screw also serves, by its engagement with the ends of the said slot, to limit the axial movement of the cup-shaped member 35 and thereby of flange or disk 33.

The relative location of the slots 27 in flange 19 and the openings 34 in the flange or disk 33 is such that, when the inner ends of rods 29 are substantially in engagement with the outer walls of slots 27 and the flange 33 is in its outer position, the taper of the support formed by rods 29 substantially conforms to the taper of the bore of the blank A, as shown in Fig. 1. Moreover, the support is so designed that, when the parts are in the position just described, the bore of a record placed thereon will tightly engage the rods 29 when the inner end of the record is still a slight distance from the disk 19, as shown in Fig. 1. It is evident that an inward pressure, sufficient to cause movement of the inner end of any of the rods 29 toward the axis of the support will, by reason of the engagement of the rods with the relatively inclined slots 27 and 28, cause rotation of the disk 20 with respect to disk 19 in a direction opposite the arrow shown in Fig. 2 and thereby cause a like movement of the rest of the rods 29. By reason of the radial arrangement of the slots 27 in disk 19, the inner ends of rods 29 are constrained to movement in a radial direction only with respect to the axis of the support, upon the relative rotation of disks 19 and 20 and, as the slots 28 in disk 20 are located at equal distances from the axis of the support and are respectively inclined at equal angles with respect to the slots 27, the rods 29 will be caused to move simultaneously and uniformly toward or away from the axis of the support, according to the direction of such relative rotation.

In using my invention, a record A is placed upon the support by merely sliding the same along the rods 29 until it engages the same with sufficient firmness to be held thereon by friction. At this time, the record will occupy a position on the support corresponding to that shown in Fig. 1 with the bore of the record firmly in engagement with the rods 29 for substantially their entire length. The record A is now pushed still farther onto the support until the inner end thereof engages the disk 19, whereupon the inward pressure exerted by the walls of the larger end of the bore of the record will cause inward movement of the inner ends of the rods 29, which movement will be radial and uniform for all the rods by reason of the action of disks 19 and 20 and their slots 27 and 28 as above described. By reason of the action of spring 23, however, the rods 29 will be maintained in such firm engagement with the bore of the record A as to prevent relative rotation of the latter with respect to the support in the operation of the phonograph. It will, therefore, be apparent that the cylindrical records may be always pushed onto my improved support into engagement with the flange or disk 19 without any danger of breaking the same at the end where the bore is of greatest diameter and the material of the record is thinnest. If, however, the inner ends of rods 29 were maintained at a fixed distance from the axis of the support, the records would frequently be broken in attempting to force the same into engagement with the flange 19.

The sound records for which my improved support is designed are quite thick at that end where the diameter of the bore is smallest, and accordingly are strong enough at this end to prevent breaking thereof, by the outward pressure exerted thereon by the outer ends of rods 29 of my support, when pushed from the position shown in Fig. 1 into engagement with the flange or disk 19.

When it is desired to remove the record A from the support, it is simply necessary to force the cup shaped member 35 and thereby disk 33 inwardly toward flange 19 to the position shown in Fig. 7. Thereupon the disk or flange 33, by reason of the engagement of rods 29 with the openings 34 thereof, will cause the collapsing of the record support by moving the outer ends of rods 29 toward the axis of the support and thereby sufficiently increase the taper of the support to remove the rods from tight engagement with the bore of record A and permit the latter to be easily removed by hand, even though previous to the collapsing of the support, the record may have been securely shrunk or clamped thereon. I preferably taper the rods 29, as shown at 40, over the portions adapted to be engaged by the flange or disk 33, whereby the amount of inward or outward movement of the rods 29 for a given amount of longitudinal shifting of the flange 33 is materially increased.

It is to be understood, of course, that my improved support is equally adapted for sound records and sound record blanks, and that, in the accompanying claims, the term "record" is intended to include both a sound record and a sound record blank, while the term "records" is intended to include both sound records and sound record blanks.

While I have shown and specifically described the preferred embodiment of my invention, it is to be understood, of course, that many modifications in the construction and arrangement thereof may be made without any departure from the spirit of my invention and the scope of the appended claims.

Having now described my invention, what I claim as new and desire to protect by Letters Patent of the United States is as follows:

1. In a support for sound records, the combination of a rotatable member, a record engaging member, and a device resiliently connected to said rotatable member for rotary movement with respect thereto and coacting therewith when turned with respect thereto in either direction to positively change the position of said record engaging member with respect to the axis of the support, substantially as described.

2. In a support for sound records, the combination of a member adapted to engage the bore of a record, a device coacting with said member adjacent one end thereof and operable to positively move said member at such end either toward or away from the axis of the support, and means operable independently of said device and coacting with said member adjacent the other end thereof to change the inclination of said member with respect to the axis of the support, substantially as described.

3. In a support for sound records, the combination with a plurality of record engaging members, of means comprising a plurality of relatively rotatable members adapted by their relative rotation in either direction to positively change the relative position of said record engaging members, substantially as described.

4. In a support for sound records, the combination with a plurality of record engaging members, of means comprising a pair of positively and resiliently connected relatively rotatable members adapted by their relative rotation in either direction to change the relative position of said record engaging members, substantially as described.

5. In a phonograph, the combination with a shaft, of a plurality of record engaging members extending longitudinally thereof, and supporting means for said members comprising a plurality of relatively rotatable members adapted by their relative rotation in either direction to positively change the inclination of said record engaging members with respect to said shaft, substantially as described.

6. In a phonograph, the combination with a shaft, of a plurality of record engaging members extending longitudinally thereof, and means comprising a member capable of rotary movement with respect to said shaft and adapted by such rotary movement in either direction to positively change the position of said record engaging members with respect to the shaft, substantially as described.

7. In a phonograph, the combination with a shaft, of a plurality of record engaging members extending longitudinally thereof, and supporting means for said record engaging members comprising a pair of members having a resilient connection, one of said pair of members being fast on said shaft and the other being loose thereon, said pair of members being adapted by relative angular movement thereof in either direction to positively change the relative position of said record engaging members, substantially as described.

8. In a support for sound records, the combination of a record engaging member, and supporting means for said member comprising a pair of independently operable devices adapted to coact with said member adjacent its ends respectively to positively move said member at its ends either toward or away from the axis of the support, substantially as described.

9. In a support for sound records, a plurality of record engaging members, and supporting means for said members comprising a plurality of relatively rotatable members in engagement therewith, said relatively rotatable members being provided with means whereby movement of any of said record engaging members either toward or from the axis of the support will positively cause relative rotation of said relatively rotatable members and thereby effect a similar movement of the rest of said record engaging members, substantially as described.

10. In a phonograph, the combination with a shaft, a plurality of longitudinally extending record engaging members, and supporting means for said members comprising a pair of members, one of which is fast on said shaft and the other of which is loose on said shaft and resiliently connected to the fast member, said pair of members being provided with a plurality of pairs of coacting slots respectively engaged by said record engaging members, the slots of each pair being relatively inclined, whereby relative rotation of said pair of members will effect the simultaneous movement of said record engaging members toward or away from said shaft, substantially as described.

11. In a phonograph, the combination with a shaft, of a plurality of record engaging members extending longitudinally thereof, and supporting means for said members comprising a plurality of relatively rotatable members provided with means whereby such members will, upon their relative rotation, positively change the relative position of said record engaging members and whereby movement of any of said record engaging members either toward or from said shaft will positively cause relative rotation of the relatively rotatable members, substantially as described.

12. In a phonograph, the combination with a shaft, of a plurality of record engaging members extending longitudinally thereof, and supporting means for said members comprising a pair of relatively rotatable members provided with means comprising a plurality of pairs of relatively inclined slots respectively coacting with said record engaging members, whereby the relative rotation of said pair of members will effect a change in the relative position of said record engaging members and whereby movement of any of said record engaging members toward or from said shaft will cause relative rotation of the relatively rotatable members, substantially as described.

13. In a phonograph, the combination with a shaft, of a plurality of record engaging members extending longitudinally thereof, supporting means for said members comprising a pair of relatively rotatable members provided with means comprising a plurality of pairs of relatively inclined slots respectively coacting with said record engaging members, whereby the relative rotation of said pair of members will effect a change in the relative position of said record engaging members and whereby movement of any of said record engaging members toward or from said shaft will cause relative rotation of the relatively rotatable members, and resilient means constantly tending to maintain said relatively rotatable members in a predetermined relative position, substantially as described.

14. In a support for sound records, the combination with a record engaging member, of a pair of relatively rotatable members adapted by their relative rotation in either direction to positively move the record engaging member with respect to the axis of the support, substantially as described.

15. In a support for sound records, the combination with a record engaging member, of a pair of adjacent and relatively rotatable members which coact to form a support for the record engaging member at one end thereof and which are adapted by their relative rotation to move said record engaging member with respect to the axis of the support, substantially as described.

16. In a support for sound records, the combination with a record engaging member, of a pair of relatively rotatable members adapted by their relative rotation in one direction to positively move the record engaging member toward the axis of the support, substantially as described.

This specification signed and witnessed this 26th day of Sept., 1913.

NEWMAN H. HOLLAND.

Witnesses:
WILLIAM A. HARDY,
FREDERICK BACHMANN.